Oct. 10, 1967

R. J. MILLARD 3,346,783

ASSEMBLY OF SOLID ELECTROLYTIC CAPACITORS

Filed April 16, 1965

INVENTOR
Richard J. Millard

BY Connolly and Hutz
ATTORNEYS

United States Patent Office 3,346,783
Patented Oct. 10, 1967

3,346,783
ASSEMBLY OF SOLID ELECTROLYTIC CAPACITORS
Richard J. Millard, Williamstown, Mass., assignor to Sprague Electric Company, North Adams, Mass., a corporation of Massachusetts
Filed Apr. 16, 1965, Ser. No. 448,619
3 Claims. (Cl. 317—230)

ABSTRACT OF THE DISCLOSURE

A plurality of solid electrolyte sub-capacitors are interconnected between terminal discs by conductors on the discs. The assembly of sub-capacitors and discs is mounted within a container with a unit terminal from one disc connected to the container and a unit terminal from the other disc insulatingly extending from the container.

---

This invention relates to solid electrolyte capacitors, and more particularly to solid electrolyte capacitors having increased reliability.

Solid electrolyte capacitors presently enjoy wide utilization where size, weight, and reliability are important circuit considerations. Such characteristics are interrelated in that reduced thickness of oxide film will increase the capacitance for a given weight and size; however, such reduction in oxide thickness will reduce reliability by lowering the voltage rating and the allowable operating temperature of the capacitor. For these and other reasons, the solid capacitor is presently limited for reliable operation to below 125 volts at 85° C. or 83 volts at 125° C.

It is an object of this invention to overcome the foregoing and related disadvantages of the prior art.

It is a further object of this invention to produce a solid electrolyte capacitor of high reliability having high voltage rating at elevated temperatures.

A still further object of this invention is to produce a solid electrolyte capacitor of high reliability having a voltage rating in excess of 150 volts at 125° C.

A still further object of this invention is to produce a capacitor having increased circuit protection in regard to capacitor short circuits.

Figure 1:
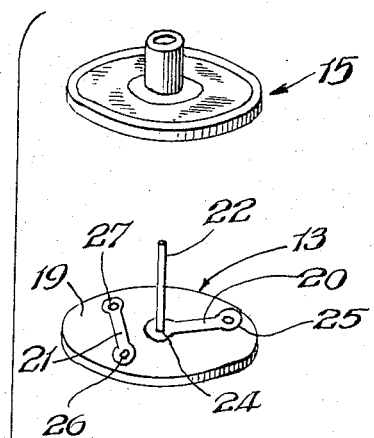
Figure 2:
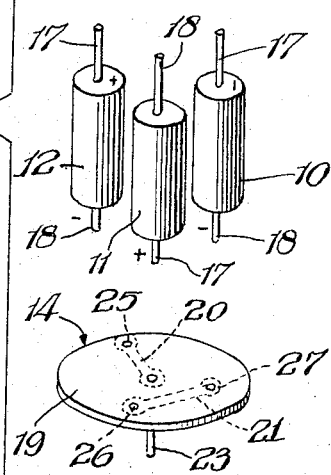
Figure 2:
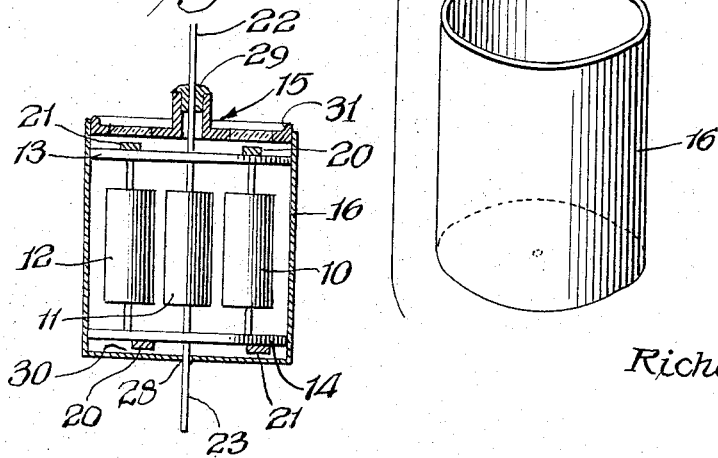

These and other objects will be apparent from the following description and drawing, in which:

FIGURE 1 is an exploded side view in isometric of the members which are utilized to produce the capacitor in accordance with this invention; and FIGURE 2 is a view partly in cross-section and partly in elevation of a capacitor produced in accordance with this invention.

In its broadest scope, the objects set forth are achieved in accordance with this invention by the production of a capacitor comprising a plurality of solid electrolyte sub-capacitors disposed within a container. The sub-capacitors are in connection to terminals which extend from the container.

In a more limited sense, the objects set forth are achieved in accordance with this invention by production of a capacitor comprising a metal container having an insulating seal at one end. Three solid electrolyte sub-capacitors are disposed within the container, in series connection to each other, between an anode and cathode terminal disc. The anode terminal disc has an anode terminal thereon which extends away from the sub-capacitors and its in anodic connection to them. The cathode terminal disc has a cathode terminal thereon which extends away from the sub-capacitors and is in cathodic connection to them. The anode terminal extends from the container through the insulating seal whereas the cathode terminal extends through the orifice in the opposite end of the container and is soldered to the container at this point.

In FIGURE 1, the member parts of the capacitor are shown over one another in essentially the same relationship such members will assume in the completed capacitor.

In this figure, three solid electrolyte sub-capacitors 10, 11, and 12 are illustrated with an upper terminal disc 13 and a lower terminal disc 14, above and below them. A glass-to-metal sealing plug 15 is disposed over the upper disc 13 while a container 16 is shown beneath the lower disc 14, in position to receive the member parts.

The sub-capacitors 10, 11, and 12 are cylindrical shaped with an anode lead 17 and cathode lead 18 extending from opposite ends. These sub-capacitors 10, 11, and 12 are insulated from one another but yet arranged in a tight circle approximately 120° apart with their longitudinal axis substantially parallel to the longitudinal axis of the container 16.

The anode leads 17 of sub-capacitors 10 and 12 are shown adjacent the upper disc 13, whereas the cathode lead 18 of sub-capacitor 11 is adjacent this disc 13. Such arrangement permits a series connection to be conveniently made between the sub-capacitors.

The discs 13 and 14 are identical in construction. Each consists of a flat insulating wafer 19 of sheet or laminated resin or the like upon which a circuit may be deposited by suitable means such as by printing, photoetching or the like. In the illustrated case, two conducting strips 20 and 21 are attached to one surface of each wafer 19. The strips 20 and 21, which may be copper or the like, have apertures at opposing ends over corresponding orifices in the wafer 19. The wafers 19 are of such diameter as to closely fit the container thereby being self-centering in the container.

Strip 20 is secured to the wafer 19 with aperture 24 over the center of the wafer 19 and aperture 25 at a point near the circumference of the wafer 19. Strip 21 is positioned with both apertures 26 and 27 near the circumference of the wafer 19. The longitudinal axis of strip 21 is essentially at right angles to the longitudinal axis of strip 20 so that the three circumferential apertures 25, 26, and 27 are approximately 120° apart.

As shown, terminals 22 and 23 are connected, in ohmic contact, to strip 20 at the center of each wafer 19 and extend coaxially from the surface, of the wafer 19, upon which the strips 20 and 21 are attached.

The terminals 22 and 23 are identical, being of nickel or the like; however, in the completed assembly, terminal 22 which extends from disc 13 is employed as the anode terminal while terminal 23 which extends from disc 14 becomes the cathode terminal.

The completed discs 13 and 14 are essentially identical. However, as shown in FIGURE 1, the discs 13 and 14 are positioned with the terminals 22 and 23 extending away from the sub-capacitors. Furthermore, disc 13 is rotated 120° with respect to disc 14 so that the aperture 25 of disc 13 is over aperture 27 of disc 14.

The position of the discs 13 and 14 then permits a series connection of the sub-capacitors 10, 11, and 12 and terminals 22 and 23 to be made by connecting the leads 17 and 18 of each sub-capacitor to the adjacent strip aperture.

Thus, lead 17 of sub-capacitor 10 is connected to terminal 22 by connection to strip 20 through aperture 25 of upper disc 13, by soldering or the like, and lead 18 of the same sub-capacitor 10 is connected to strip 21 by aperture 27 of lower disc 14. Lead 17 of sub-capacitor 11 is connected to the other end of strip 21 through aperture 26 of lower disc 14, and lead 18 of the sub-capacitor 11 is fastened to strip 21 of the upper disc 13 through aperture 26. Finally, lead 17 of sub-capacitor 12 is also connected to strip 21 of upper disc 13 by aperture 27, while lead 18 of the same sub-capacitor 12 is connected to terminal 23 by connection to strip 20 of lower disc 14 by aperture 25. All connections described should be substantially ohmic contacts.

The length of the strips 20 and 21 is such as to provide a distance slightly larger than the diameter of any one sub-capacitor between adjacent circumferentially spaced apertures 25, 26, and 27. This provides a close grouping of the sub-capacitors 10, 11, and 12 in the final package while leaving an insulating space between adjacent sub-capacitors. Such insulating space is necessary if the sub-capacitors 10, 11, and 12 have outer conductive surfaces.

Furthermore, some insulation must be provided between the sub-capacitors 10, 11, and 12 and the container 16, where the sub-capacitors 10, 11, and 12 have outer conductive coatings and the container is a conductor as is the case in the described embodiment. Such insulation may be provided by any suitable means such as by positioning the sub-capacitors 10, 11, and 12 so as not to touch the wall of the container 16. Such insulation is, of course, unnecessary if the individual sub-capacitors 10, 11, and 12 have outer insulating coatings, or where the container 16 is an insulator.

Connection of the sub-capacitors as described above will provide a series connection from anode terminal 22 through each sub-capacitor 10, 11, and 12 successively, to terminal 23. Other methods of providing a series connection suggest themselves, for example, the leads 17 and 18 of the sub-capacitors could be utilized to eliminate the conducting strips 20 and 21 by soldering the appropriate leads together and to the appropriate terminals 22 and 23.

FIGURE 2 shows the completed capacitor having a sub-assembly of discs 13 and 14 with connected sub-capacitors disposed in the metal container 16. Terminal 23 protrudes through an orifice in the closed end of the container 16 and is soldered as at 28. The conducting strips on the lower disc 14 are insulated from the bottom of the container 16 by a space 30, which is provided by appropriate position of the terminal 23 during connection to the container 16.

Other suitable insulating means for the strips 20 and 21 could be employed. For example, an insulating annulus could be employed between the strips and the bottom of the container. Furthermore the strips 20 and 21 could be secured to the sub-capacitor side of the wafers 19 with suitable insulation provided between the strips and the sub-capacitors. Such insulation could, for example, be provided by spacing the sub-capacitors 10, 11, and 12 away from the strips 20 and 21.

The container 16 in this embodiment is solderable metal such as nickel or brass; however, various materials including insulators could be utilized for slightly modified embodiments. The capacitor, as illustrated in FIGURE 2 is completed by soldering the glass-to-metal seal 15, at the center 29, around terminal 22 and at the periphery 31 of the seal.

The sub-capacitors 10, 11, and 12 in this embodiment are solid tantalum capacitors of 3 $\mu f.$ capacitance having a 67 volt rating at 125° C. This provides a complete capacitor produced in accordance with the invention of 1 $\mu f.$ with 200 volt rating at 125° C.

Furthermore, additional circuit protection results, since if shorting occurs in any one sub-capacitor, the remaining two sub-capacitors will continue to function with reduced overall value and less reliability than in the ideal case.

The sub-capacitors employed in the specific embodiment above are completely encased capacitors in themselves; however, they do not need to be such when an outer sealed container as shown in FIGURE 2 is employed.

The described sub-capacitors may also be arranged in parallel in accordance with this invention to provide increased overall capacitance with the voltage rating of a single sub-capacitor. Such parallel arrangement would require minor modifications obvious to one skilled in the art. For example, each terminal disc could provide three conducting strips radiating from the terminal to each sub-capacitor. The sub-capacitors would be arranged with like terminals in connection to the same terminal disc. It should also be noted that in such arrangement no insulation is necessary between sub-capacitors or between the sub-capacitors and the container.

Furthermore, although the invention has been described in terms of a specific embodiment, it should be understood that many different embodiments may be made without departing from the spirit and scope hereof and that the invention is not limited except as defined in the appended claims.

What is claimed is:

1. A capacitor unit comprising an anode terminal disc and a cathode terminal disc disposed in spaced substantially parallel planes, a plurality of solid electrolyte sub-capacitors each including an anode terminal and cathode terminal extending from opposite ends thereof, said sub-capacitors disposed in spaced planes between said terminal discs and each having one of its terminals electrically connected to a terminal on each of said anode and cathode terminal discs, a unit terminal mounted on each of said anode and cathode terminal discs respectively, each of said discs having conductors connecting at least one terminal thereon to the unit terminal on the disc, and said conductors on the two discs together interconnecting the sub-capacitors into a unit electrical circuit between said unit terminals on the respective discs, a sealed container enclosing said sub-capacitors and said terminal discs with the unit terminal on said anode terminal disc sealingly extending therethrough, said container comprising terminal means for electrically connecting to the unit terminal on said cathode terminal disc, and means for electrically insulating the unit terminals from each other.

2. The capacitor as claimed in claim 1 wherein said connected sub-capacitors are in series connection to each other.

3. The capacitor as claimed in claim 1 wherein said connected sub-capacitors are in parallel connection to each other.

References Cited

UNITED STATES PATENTS

| 2,628,270 | 2/1953 | Himmel | 317—101 |
| 2,892,137 | 6/1959 | Sperry | 317—242 |
| 2,934,814 | 5/1960 | Williams et al. | 317—101 |
| 2,986,675 | 5/1961 | Burson et al. | 317—101 |

JAMES D. KALLAM, *Primary Examiner.*